(12) United States Patent
Olsen et al.

(10) Patent No.: US 12,144,452 B2
(45) Date of Patent: Nov. 19, 2024

(54) END CAP OR CONNECTOR FOR WHEEL SYSTEM AND METHOD

(71) Applicant: Bannack Medical LLC, Gilbert, AZ (US)

(72) Inventors: Arlen Olsen, Clifton Park, NY (US); Joel Price, Germantown, MD (US)

(73) Assignee: BANNACK MEDICAL LLC, Gilbert, AZ (US)

( * ) Notice: Subject to any disclaimer, the term of this patent is extended or adjusted under 35 U.S.C. 154(b) by 304 days.

(21) Appl. No.: 17/510,787

(22) Filed: Oct. 26, 2021

(65) Prior Publication Data

US 2023/0130071 A1    Apr. 27, 2023

(51) Int. Cl.
*A47H 3/10* (2006.01)
*A47H 1/18* (2006.01)
*A61G 10/00* (2006.01)

(52) U.S. Cl.
CPC .................. *A47H 3/10* (2013.01); *A47H 1/18* (2013.01); *A61G 10/005* (2013.01)

(58) Field of Classification Search
CPC .......... A47H 13/00; A47H 1/06; A47H 15/04; A47H 23/10; A47H 15/02; A47H 1/18; B61G 10/005
See application file for complete search history.

(56) References Cited

U.S. PATENT DOCUMENTS

| | | | |
|---|---|---|---|
| 1,571,394 A | 2/1926 | Chalmer | |
| 2,405,020 A | 7/1946 | Dierking | |
| 2,594,605 A | 4/1952 | Zoppelt | |
| 2,741,923 A | 4/1956 | Bradley | |
| 2,968,205 A | 1/1961 | Springate | |
| 3,107,947 A | 10/1963 | Hulterstrum | |
| 3,142,858 A | * 8/1964 | Bieda | |
| 3,585,674 A | 6/1971 | Golden | |
| 3,616,486 A | 11/1971 | Ford et al. | |

(Continued)

FOREIGN PATENT DOCUMENTS

| | | |
|---|---|---|
| CH | 657511 A5 | 9/1986 |
| CN | 107495816 A | 12/2017 |

(Continued)

OTHER PUBLICATIONS

CubeCare: Cubicle Curtain Tracks for Hospitals and Medical Facilities: https://www.cubecare.com/products/cubicle-curtain-tracks/. 5 pages.

(Continued)

*Primary Examiner* — Christine M Mills
*Assistant Examiner* — Matthew J Sullivan
(74) *Attorney, Agent, or Firm* — Schmeiser, Olsen & Watts, LLP

(57) ABSTRACT

Disclosed is an end cap or connector for a wheel system, the end cap or connector has a cylindrical portion for engagement with one of an extension or a quick release system, the cylindrical portion further including a catch for attachment to the extension; and a cap, extending from said cylindrical portion, said cap having a connector for attaching to a wheel carriage or another extension. Also disclosed is a method which includes the end cap and inserting the end cap into an extension such as a hollow tube or rod; and releasably attaching the end cap to a wheel system.

9 Claims, 12 Drawing Sheets

(56) References Cited

U.S. PATENT DOCUMENTS

| | | | |
|---|---|---|---|
| 3,626,429 A * | 12/1971 | Toder | |
| 3,971,601 A | 7/1976 | Sytsma | |
| 4,023,235 A | 5/1977 | Cohen et al. | |
| 4,102,007 A * | 7/1978 | Janson | |
| 4,141,106 A | 2/1979 | Dixon | |
| 4,203,511 A | 5/1980 | Uhing | |
| 4,228,738 A | 10/1980 | Forshee | |
| 4,229,857 A * | 10/1980 | Toder | |
| 4,282,630 A | 8/1981 | Toder | |
| 4,302,865 A | 12/1981 | Dixon et al. | |
| 4,576,096 A | 3/1986 | Toder | |
| 4,643,238 A * | 2/1987 | Tachikawa et al. | |
| 4,837,891 A | 6/1989 | Toma et al. | |
| 4,915,153 A | 4/1990 | Toti | |
| 5,016,318 A | 5/1991 | Harris | |
| D379,060 S | 5/1997 | Laga | |
| D379,427 S | 5/1997 | Laga | |
| 6,098,695 A * | 8/2000 | Schwingle | E05F 15/605 160/199 |
| 6,098,699 A * | 8/2000 | Junius | A47H 15/04 160/330 |
| 6,564,851 B1 * | 5/2003 | Liao | A47H 15/04 16/87.4 R |
| 6,618,900 B2 * | 9/2003 | Spork | E05D 15/0639 16/105 |
| D492,580 S | 7/2004 | Tyburk et al. | |
| 6,820,306 B2 | 11/2004 | Huang | |
| 6,938,927 B1 | 9/2005 | Martin et al. | |
| 7,360,576 B2 | 4/2008 | Lin | |
| 7,698,781 B2 | 4/2010 | Cai | |
| 7,909,491 B2 * | 3/2011 | Hoets | F21S 8/06 362/382 |
| 8,307,499 B2 * | 11/2012 | Ruffo | A47H 13/00 160/178.1 V |
| 8,397,346 B2 * | 3/2013 | Peters | A47H 5/14 16/95 D |
| 9,125,509 B2 | 9/2015 | Graneto, III | |
| 9,320,379 B2 | 4/2016 | Sourain et al. | |
| 9,458,654 B2 | 10/2016 | Palsson et al. | |
| 9,480,357 B2 | 11/2016 | Price et al. | |
| D795,157 S | 8/2017 | Biesenbruck et al. | |
| 10,570,662 B2 * | 2/2020 | Miroshnichenko | E04F 10/02 |
| 10,758,072 B2 | 9/2020 | Hatton et al. | |
| 11,297,966 B2 * | 4/2022 | Alonso | A47H 15/04 |
| 11,399,650 B2 * | 8/2022 | Ko | A47H 1/06 |
| D962,751 S | 9/2022 | Olsen et al. | |
| D962,752 S | 9/2022 | Olsen et al. | |
| D962,753 S | 9/2022 | Olsen et al. | |
| D982,422 S | 4/2023 | Olsen et al. | |
| D1,011,869 S | 1/2024 | Olsen et al. | |
| D1,012,551 S | 1/2024 | Olsen et al. | |
| 2004/0117945 A1 | 6/2004 | Huang | |
| 2005/0239588 A1 | 10/2005 | Lin | |
| 2006/0001254 A1 | 1/2006 | Malone | |
| 2007/0012346 A1 | 1/2007 | Choi | |
| 2007/0136986 A1 * | 6/2007 | Chen | E06B 9/323 16/91 |
| 2009/0288785 A1 * | 11/2009 | Graneto, III | A47H 15/02 160/340 |
| 2010/0125987 A1 * | 5/2010 | Barkun | A47H 13/00 24/716 |
| 2010/0139873 A1 | 6/2010 | Gardner | |
| 2011/0283479 A1 | 11/2011 | Peters et al. | |
| 2012/0018106 A1 | 1/2012 | Robledo | |
| 2012/0037324 A1 * | 2/2012 | Graneto, III | A47H 5/032 160/341 |
| 2012/0167350 A1 * | 7/2012 | Chou | E06B 9/262 24/115 F |
| 2012/0198655 A1 | 8/2012 | Lapping | |
| 2013/0047331 A1 | 2/2013 | Parker et al. | |
| 2014/0026359 A1 * | 1/2014 | Borgerding | A47H 15/02 16/88 |
| 2017/0231413 A1 * | 8/2017 | Schöpfer | A47H 15/00 160/330 |
| 2017/0284155 A1 * | 10/2017 | Ganzi | E06B 9/78 |
| 2018/0279818 A1 | 10/2018 | Goelst | |
| 2020/0080367 A1 * | 3/2020 | Daugaard | A47H 1/13 |
| 2022/0015564 A1 * | 1/2022 | Olsen | A47H 13/04 |
| 2022/0015566 A1 * | 1/2022 | Olsen | A47H 15/02 |
| 2022/0049546 A1 * | 2/2022 | Daugaard | A47H 5/0325 |
| 2022/0240707 A1 * | 8/2022 | Roberts | A47H 13/06 |
| 2022/0265078 A1 * | 8/2022 | Hsu | A47H 99/00 |
| 2022/0275682 A1 * | 9/2022 | Chuang | A47H 23/05 |
| 2022/0279954 A1 * | 9/2022 | Olsen | A47H 1/10 |
| 2022/0322863 A1 * | 10/2022 | Olsen | A47H 15/02 |
| 2023/0130071 A1 | 4/2023 | Olsen et al. | |

FOREIGN PATENT DOCUMENTS

| | | |
|---|---|---|
| CN | 108903569 A | 11/2018 |
| DE | 102017010861 A1 | 5/2019 |
| EP | 2428142 A2 | 3/2012 |
| EP | 3308680 A2 | 4/2018 |
| FR | 2333113 B1 | 3/1981 |
| GB | 2358123 A | 7/2001 |
| GB | 2385511 A | 8/2003 |
| GB | 2457075 B | 10/2011 |
| GB | 2489485 A | 10/2012 |
| GB | 2493773 A | 2/2013 |
| GB | 2515504 A | 12/2014 |
| JP | 2002165698 A | 6/2002 |
| JP | 3562672 B2 | 9/2004 |
| JP | 2006314537 A | 11/2006 |

OTHER PUBLICATIONS

Covoc Corporation: Cubicle Track Accessories: https://www.covoc.com/accessories-2/. 4 pages.

Inpro: Optitrac ball chain carrier: https://www.inprocorp.com/products/privacysystems/cubicle-curtaintrack-andaccessories/optitrac-ballchain-carrier/. 6 pages.

Medline Industries, Inc.: Standard Supreme Cubicle Curtain Tracks and Accessories: https://punchout.medline.com/product/Standard-Supreme-Cubicle-Curtain-Tracks-by-Imperial-Fastener/Parts/Z05-PF184262? question=&index=P4&indexCount=4. 1 page.

Curtain-Tracks.com: 7191 Privacy Cubicle Carrier or Roller w/ Hook (14/bag): https://www.curtain-tracks.com/privacy-cubicle-roller.html. 1 page.

Tru-Roll: Tru-Roll Track Carrier: https://truroll.com/wp-content/uploads/2014/12/TruRoll-2017-Catalog-Ed1.pdf. 35 pages.

ALCO sales & Service Co.: Cubicle Track Carriers: https://www.alcosales.com/images/50178.pdf. 3 pages.

HAIGuard: Break-Away Carrier (Model CC-1003): Retrieved from https://haiguard.com/track-systems/aluminum-track-system/. 1 page.

RHINOCATS: Rear Runner Curtain Runner Rear Holder Roller Diameter 0.2 inches (5.5 mm), Silent, Lightweight Type, Compatible with Square and C Types, Supports Groove Width 0.2-0.3 inches (6-8 mm): https://www.amazon.co.jp/-/en/RHINOCATS-Diameter-Lightweight-Compatible-Supports/dp/B07VBQZPGJ/ref=zg_bs_2157258051_13/357-55745202158114?_encoding=UTF8&refRID=V5JNTS7TXJ1ND4KYTA9M&th=1. 1 page.

Chuang beauty: Window Bijin RUN-ATO10P Rear Curtain Runners: https://www.amazon.co.jp/Window-Bijin-RUN-ATO10P-Curtain-Runners/dp/B00MXQQBK2/ref=pd_day0_7/357-5574520-2158114?pd_rd w=7h0a4&pf_rd_p-fab5dbe4-f0e5-4fa4-b9db-f6338912edc6&pf_rd _r=RGFESP3XWG01DFXFGDMX&pd_rd_r=364e4a2e-3050-44ba-80e5-ee9eb1fa6054&pd_rd_wg=nA6IW&pd_rd_i=B00MXQQBK2&psc=1#HLCXComparisonWidget_feature_div. 3 pages.

Rod Desyne: Ball Bearing Carrier with Stainless hooks for Multi-Purpose Room Divider Track: https://www.homedepot.com/p/Rod-Desyne-Ball-Bearing-Carrier-with-Stainless-hooks-for-Multi-Purpose-Room-Divider-Track-Set-of-10-AUC1931/303506245. 4 pages.

VRSS: flexible bendable straight curved shower curtains track for I and u shape bay windows with instruction mounting accessories include (3m): https://www.amazon.in/VRSS-Flexible-Bendable-Instruction-Accessories/dp/B06XDZSV26. 4 pages.

(56) References Cited

OTHER PUBLICATIONS

Curtain Track: 6018 metal block carrier with nylon wheels: https://www.curtain-tracks.com/6018-metal-block-carrier.html. 6 pages.
Medical Products Direct: Flexible Curtain Track, Nylon Carrier with Hook: https://www.medicalproductsdirect.com/flexible-curtain-track-nylon-carrier-10-pack.html. 3 pages.
DFB Sales: Draperies for Business: https://www.dfbsales.com/wp-content/uploads/2019/03/Drapery_DFB.pdf. 16 pages.
COVOC: COVOC 9038 Carrier With Canted Wheels and Bead Chain and Hook: https://www.covoc.com/covoc-9038-carrier-with-canted-wheels-and-bead-chain-and-hook/. 3 pages.
Walcot House: Curtain hook: Retrieved from: https://www.google.com/search?q=%22walcot+house%22+%22curtain+-hook%22&sa=X&bih=657&biw=1366&rlz=10%200KWM_enIN917IN91%207&hl=enUS&tbm=isch&source=iu&ictx=1&fir=m5qKZwWcxS3QTM%252CDAshTnOZvITjWM%252C_&vet=1&usg=AI4_kTxnEcGZUJMofhaVVEdu7NmGIhmRQ&ved=2ahUKEwi2u62Hwuzy%20AhXHQ30KHVzkDgMQ9QF6BAglEAE#imgrc=JTSjeC4MgLAp8M. 1 page.
Yap, Jules. "Hack a ceiling track for shower curtain", IKEAHackers; https://ikeahackers.net/2013/10/hack-a-ceiling-track-for-shower-curtain.html; Oct. 17, 2013. 6 pages.
Hasan, Afzal. Patentability Search Report for Adjustable Wheel for use in Tracks for Medical Curtains, dated Apr. 16, 2021.
Hasan, Afzal. Patentability Search Report (Updated) for Adjustable Wheel for use in Tracks for Medical Curtains, dated Sep. 16, 2021.
Restriction Requirement (Mail Date Dec. 28, 2022) for PCT International Application No. PCT/US22/46934—International Filing Date Oct. 18, 2022.
InControl—SmartGuard Disposable Privacy Curtains; ttp://globalmedics.co.nz/media//InControl_SmartGuard_Brochure_2.pdf. 12 Pages.
Marlux Disposable Hospital Curtains: https://www.marluxmedical.com/disposable-curtains. 8 pages.
Opal Health Disposible Curtains Quick Fit System, May 26, 2017. https://www.youtube.com/watch?v=XsQnyL-REhY.
Opalhealth: The Fast, hygienic alternative to traditional curtains. https://opalhealth.co.uk/benefits/. 4 pages.
Solent Blinds & Curtains: Disposable Curtains: https://solentblinds.co.uk/commercial/products/disposable-curtains/. 1 page.
EasyClick: "The Next Generation of Disposable Curtains". https://behrens.co.uk/product/easyclick-the-next-generation-of-disposable-curtains/. 2 pages.
Installing Locking Button in Telescoping Tube, Jul. 29, 2014. https://www.youtube.com/watch?v=y3V6o3eca0g.
Halder: Ball Lock Pins self-locking, with T-handle. https://www.halder.com/eng/Products/Standard-Parts/Machine-and-Fixture-Elements/Ball-Lock-Pins/Ball-Lock-Pins-self-locking-with-T-handle. 2 pages.
Rapid Refresh Shower Curtains. https://www.icpmedical.com/docs/product-sheets/Shower-Curtains-RR.pdf. 1 page.
ICP Medical: Privacy Curtains: https://icpmedical.com/docs/product-sheets/Privacy-Curtains-RR.pdf. 2 pages.
EasyClick Disposable Cubicle Curtains. https://behrens.co.uk/media/EASYCLICK-advert.jpg; 1 page.
EasyKlip Instructions. Retrieved from https://www.curtain-tracks.com/610-easyklip-mini-tarp-clip-10-per-pack.html. 1 page.
EasyKlip Midi Tarp & Banner Clip. https://www.curtain-tracks.com/610-easyklip-mini-tarp-clip-10-per-pack.html. 2 pages.
"Halder Ball Lock Pins", Oct. 23, 2017. https://youtu.be/qLTZiNngk9c.
ICP Medical: Privacy Curtains: https://www.icpmedical.com/Products/Privacy-Curtains. 2 pages.
"Installing the ICP Medical Rapid Refresh Privacy Curtain", Jun. 10, 2014. https://www.youtube.com/embed/azsr7bpMB5U?autoplay=1.
"Installing the ICP Medical Rapid Refresh Curtain Rods", Jun. 10, 2014. https://www.youtube.com/embed/lohmn8UhiRo?autoplay=1.
Hasan, Afzal. Patentability Search Report for Disposable Curtain System, dated Jul. 6, 2020.
Restriction Requirement (Mail Date Mar. 10, 2023) for U.S. Appl. No. 17/510,864, filed Oct. 26, 2021.
PCT International Search Report and Written Opinion of International Searching Authority mailed Mar. 15, 2023 corresponding to PCT International Application No. PCT/US22/46934 filed Oct. 18, 2022.
Notice of Allowance (Mail Date Mar. 27, 2023) for U.S. Appl. No. 29/813,033, filed Oct. 26, 2021.
Notice of Allowance (Mail Date Mar. 27, 2023) for U.S. Appl. No. 29/813,043, filed Oct. 26, 2021.
Office Action (Mail Date Jun. 7, 2023) for U.S. Appl. No. 29/813,043, filed Oct. 26, 2021.
Notice of Allowance (Mail Date Mar. 24, 2023) for U.S. Appl. No. 29/813,057, filed Oct. 26, 2021.
Office Action (Mail Date Jun. 23, 2023) for U.S. Appl. No. 17/510,864, filed Oct. 26, 2021.

* cited by examiner

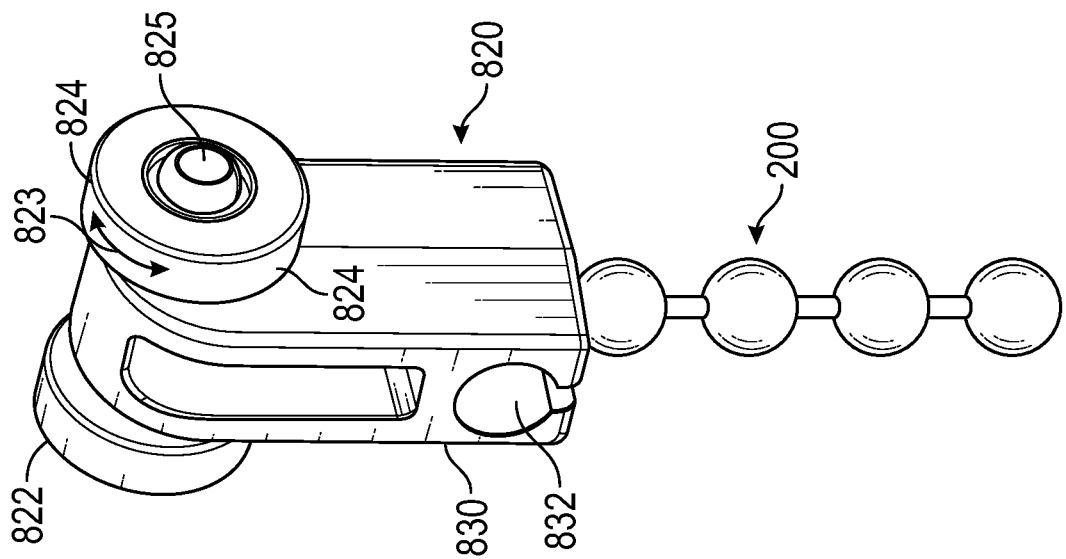
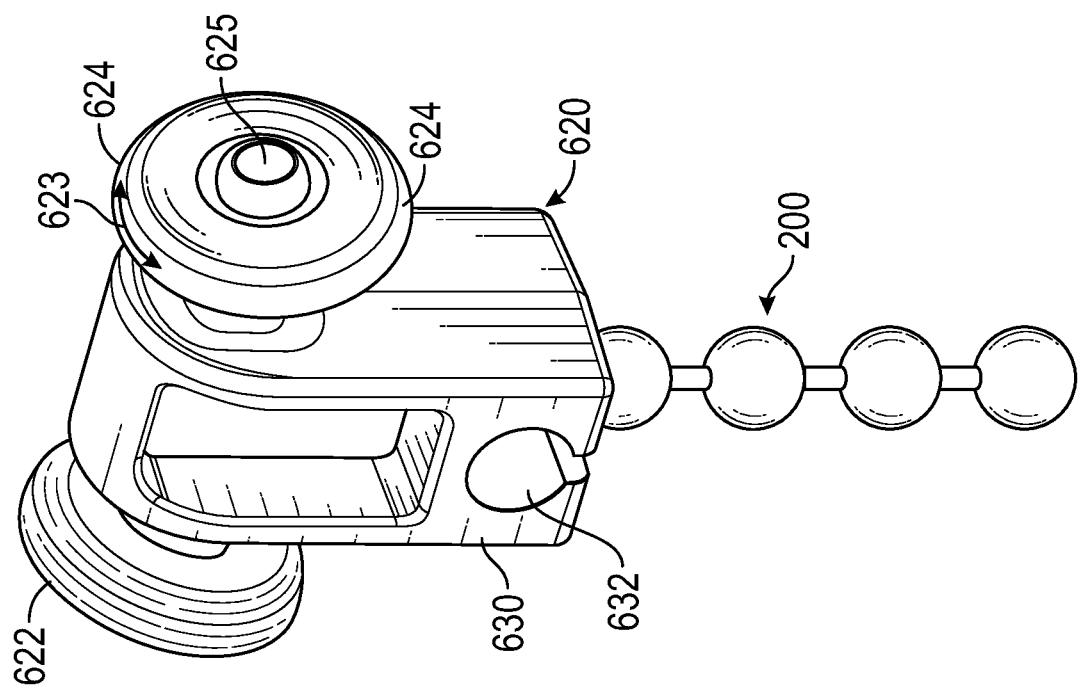

END CAP OR CONNECTOR FOR WHEEL SYSTEM AND METHOD

CROSS-REFERENCE TO RELATED APPLICATIONS

This application is related to U.S. application Ser. No. 17/225,321 filed on Apr. 8, 2021; U.S. application Ser. No. 17/011,571 filed on Sep. 3, 2020; U.S. application Ser. No. 17/004,625 filed on Aug. 27, 2020; and U.S. application Ser. No. 16/933,545 filed on Jul. 20, 2020 which all disclosures are hereby incorporated by reference in their entireties.

FIELD OF THE INVENTION

Disclosed is a wheel system and end cap or connector for curtains and method. In particular, is a wheel system having preassembled wheels and end cap for an extension or quick connect for curtains, most often, for use in health care facilities to maintain a clean environment.

BACKGROUND

Health care facilities, such as hospitals, nursing homes, doctor's offices, urgent care facilities, and long-term care facilities are becoming more and more concerned with infectious diseases being present. The COVID-19 pandemic is one major infectious disease that has brought attention to the public by the media to the concerns of cleanliness of health care facilities and other public spaces. In addition to COVID-19 are other infections diseases such as bacterial infection diseases like Anthrax, bacterial botulism, brucellosis, cholera, diphtheria, Lyme's disease, tuberculosis; fungal infectious diseases like aspergillosis, blastomycosis, candidiasis, cryptococcosis, histoplasmosis; parasitic infectious diseases like ascariasis, cryptosporidiosis, giardiasis, malaria, scabies; prion infectious diseases like Alper's syndrome, Creutzfeldt-Jakob disease, kuru; and viral infectious diseases like COVID-19, AIDS, chickenpox, Common Cold, Ebola, herpes, Influenza, mumps, rabies, rubella, viral meningitis, yellow fever and many more.

One location in the hospital that has a concern with infectious disease are the privacy curtains in locations such as the Emergency Room ("ER") and Intensive Care Unit ("ICU"). Medical personnel will take many precautions such as washing hands, wearing gloves and wearing personal protection equipment. However, while wearing gloves they will grab the curtains with their gloved hands which may leave infectious diseases on the curtains due to contact with bodily fluids such as blood, saliva, urine, mucous, phlegm, etc. In addition, patients which are surrounded by the curtain systems will cough, sneeze or perform other bodily functions which expel airborne liquids into the air surrounding their bed or private space.

Curtain systems for hospitals are generally attached to the ceiling. The curtains systems have a track which is affixed to the ceiling. Within the track are rollers, guides or wheels.

A difficulty with this system is that the tracks and hooks are attached to ceilings that can be from 7 to 12 feet above the floor. This requires maintenance personnel at the hospital to use ladders or other stools to replace the curtains.

A further difficulty is when replacing the curtain system, the wheels, guides or rollers in have hooks which many times need to be crimped causing repetitive problems with the installer having problems with muscles and tendons due to repetitive installation of the curtains on the hooks.

Another difficulty is that the most curtain systems are not easily and quickly disassembled and require personnel to remove the curtains, one hook at a time.

Another difficulty is that the track generally is sold separately or are already existing and thus when installing the elongate member or extension and quick release requires extensive work that needs to be done to attach the system in-situ while the installer is on a ladder.

Another difficulty is that the wheel systems when being replaced come in multiple sizes. The individual installing or replacing of the wheel systems needs to be selected from multiple sizes to fit the appropriate track.

Another difficulty is that hooks and metal loops don't allow for quick attachment systems to be quickly aligned due to difficulty of rotation and alignment and are susceptible to binding with one another.

SUMMARY

Disclosed is a disposable curtain system, attachment therefor and method. An advantage is the ability to quickly attach a disposable or washable curtain system to a pre-existing or installed curtain system.

Another advantage is the ability to quickly attach a disposable or washable curtain system to a pre-existing or installed track.

Another advantage is during installation, there will be no or minimal need for health care personnel to climb on ladders or stools to reach the hooks for replacement of the curtains.

Another advantage is that health care personnel will not need to crimp the hooks used on pre-existing wheel systems.

Another advantage is removal and disposal and or recycling of the curtains on a regular basis.

Another advantage is that the quick release and lock system may be usable by an installer/disassembler at approximately a height of 6-7 feet for easy installation and removal, it will have disposable curtain attachments that quickly attach and detach with a single or small number or movements during installation and disassembly.

An advantage is that the disclosed embodiments do not require a keyway or turning mechanism for installation of disposable hospital curtains as in the relevant art.

An advantage is that the disposable curtain system may be held in a receiver or cradle by gravity and it does not require a latch or lock mechanism.

An advantage is that the disposable curtain system has a quick-release having a lockable quick release with a housing with an opening therein into which a head may be inserted and dropped down. The motion makes accidental removal of the head from the opening and cradle or receiver more difficult.

Another advantage is that the head is inserted into the quick-release housing in a first direction which is perpendicular or angular to the direction that the curtains are pulled, thus alleviating accidental removal of the curtain from the curtain system.

Another advantage is the current system makes it possible to remove the end from a track and install the wheel system with the elongate member or extension and quick-release all at once. In the case of replacement, the old rollers or wheels merely need to be removed.

Another advantage is that with a link, releasably attached to an end cap, the length of the elongate member or extension may be easily changed.

Another advantage is that an end cap may rotate so that it need not align with the direction of the quick-release connectors until adjusted because the connection between the link and the end cap may swivel or rotate 360 degrees.

Another advantage is that wheel system may rotate so that it need not align with the direction of the quick-release connectors because the connection between the link and the wheel system may swivel or rotate.

Another advantage is that the link is releasably attached at the wheel system and at the end cap so that either the wheel system or the extension or quick release may be quickly detached and replaced.

Another advantage is to have a connector so that extensions may be attached to lengthen or shorten the extensions based upon ceiling height.

Another advantage is that the wheel system is dimensioned for multiple tracks thus reducing the number of wheel systems and installer must carry to fit into various tracks.

Another advantage is having a wheel system that will easily glide along the track and not bind up with hooks from nearby wheel systems.

Accordingly, various embodiments of the invention disclosed include: An end cap or connector for a wheel system, said end cap or connector comprising: a cylindrical portion for engagement with one of an extension or a quick release system, said cylindrical portion further including a catch for attachment to the extension or quick release; and a cap, extending from said cylindrical portion, said cap having a connector for attaching to a wheel carriage or another extension.

Accordingly, various embodiments of the invention disclosed include: An end cap for a wheel system, said end cap comprising: a lower portion for engagement with one of an elongate hollow tube, wherein said elongate hollow tube has openings therein for engaging said lower portion, said lower portion further including a catch for attachment to the elongate hollow rod and engaging with said openings; and an upper portion, extending from said lower portion, said upper portion having a connector for releasably attaching to a wheel carriage.

Accordingly is provided an end cap for a wheel system, said end cap comprising: a lower portion for engagement with one of an elongate hollow tube or rod; and an upper portion, extending from said lower portion, said upper portion having a connector for releasably attaching to a wheel carriage, wherein said connector has a joint that allows 360 degrees of rotation about the axis of the hollow tube or rod for alignment of a quick release.

Accordingly, various embodiments of the invention include: a method for use of an end cap with a wheel system, comprising: providing a end cap; inserting the end cap into a hollow tube or rod; and releasably attaching the end cap to a wheel system.

BRIEF DESCRIPTION

Some of the embodiments will be described in detail, with reference to the following figures, wherein like designations denote like members, wherein:

FIG. 7 shows a second embodiment of a perspective view of a wheel system according to a second embodiment of the invention;

FIG. 8 shows a perspective view of a wheel system (with end cap) according to third embodiment of the invention;

DETAILED DESCRIPTION

Figure 1:
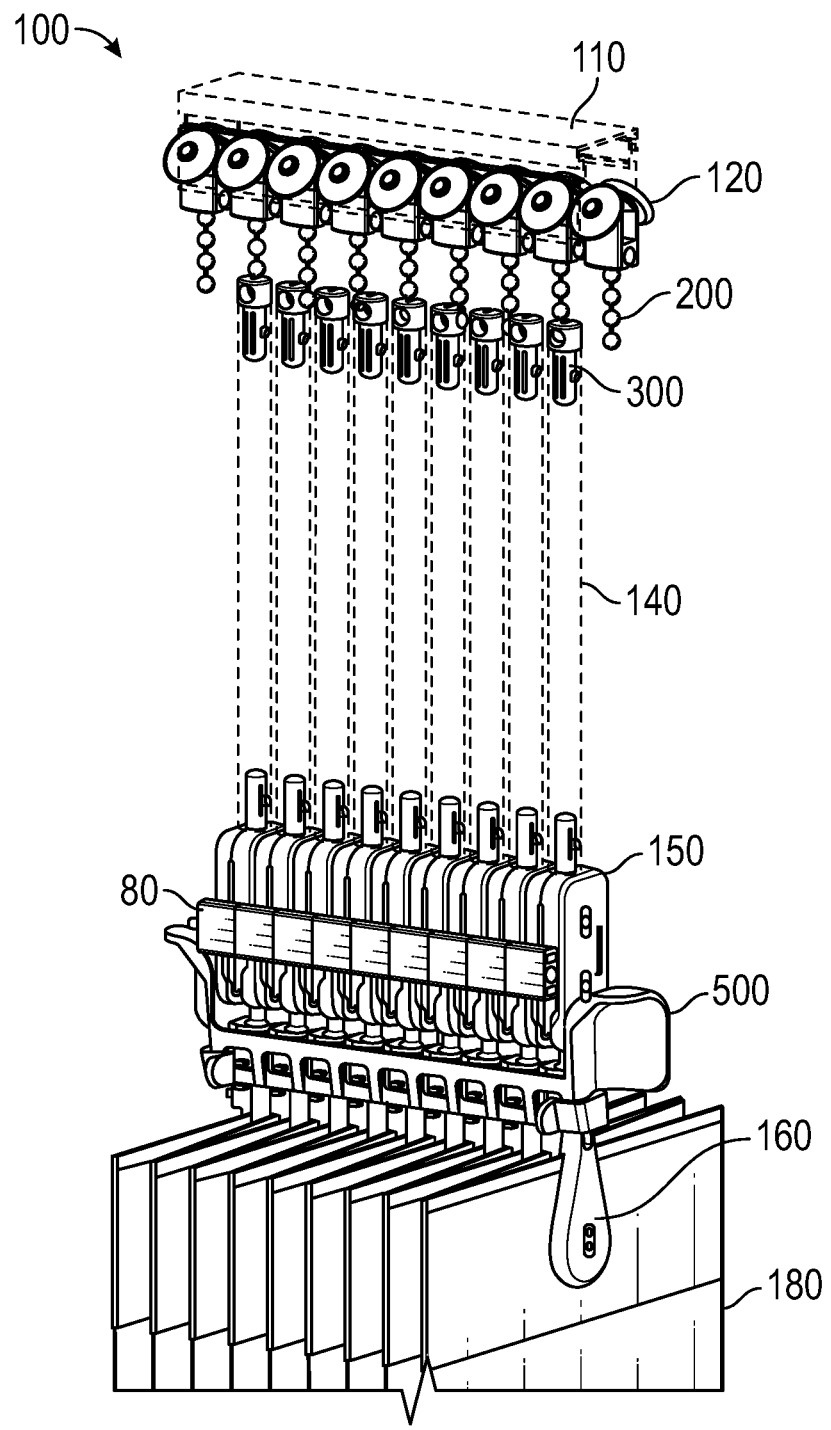
FIG. 1 shows a wheel system as part of a curtain hanging system according to an embodiment of the invention.

Disclosed are various embodiments of the inventions. Referring to FIG. 1 is a disposable curtain system 100. The disposable curtain system 100 is attached to the ceiling by a track 110. The track may be attached directly to the ceiling or hang from the ceiling on extensions. Running through the track 110 are wheel systems 120. The roller hooks or rollers or wheels with attachments have a link 200 on the end thereof for attaching an extension, elongate hollow tube, elongate hollow rod or elongate member or extension 140. The link 200 may be any connector, ball chain, bead, retaining chain, clip, clasp, chain link, catch, snap, hook, safety pin, buckle metal loop, shackle, eyelet, grommet, carabiner, spring hook, wire loop, wire with attachments on the end such as beads or balls, or any other attachment means or connector interposed between the wheel system an the end cap or extension or quick release and having a releasable attachment and adapted so that the extension or end cap or quick release does not come off the wheel system 120.

The extension 140 may be telescoping poles, poles that may be discreet sizes and interchanged or a plurality of poles that can be snapped together with a connector depending on size needed, straps which may include a buckle that may be adjusted for size or the strap may be cut, a string, cable or wire that may be adjusted or cut. Since the extension will remain in place it is important that is easily cleanable for infectious diseases with an extension pole that has disinfectant. The material of the extension should not absorb liquids but should be made from a nonabsorbent plastic such as polyvinyl, acrylic, polyacrylic, nylon, carbon composite, PVC, polyethylene or the like.

The curtain 180 comes in discreet sections, such as 6-12 feet and most commonly 9 feet. The curtain discreet sections of 9-12 feet may be snapped together with snaps so as to make longer curtains. The curtains are made from disposable recyclable material such as polypropylene. Alternatively, the curtains may be made of cloth for quick change for washing. The curtains 180 may be attached to the extension 140 with a quick-release mechanism 150 and a curtain attachment assembly or curtain attachment 160. The curtain attachment has a locking mechanism 80. The curtain attachment 160 during shipping and the initial assembly may be held together with a zip-tie, twist tie 90 or a holder such as 500 shown in FIG. 1.

Figure 2A:
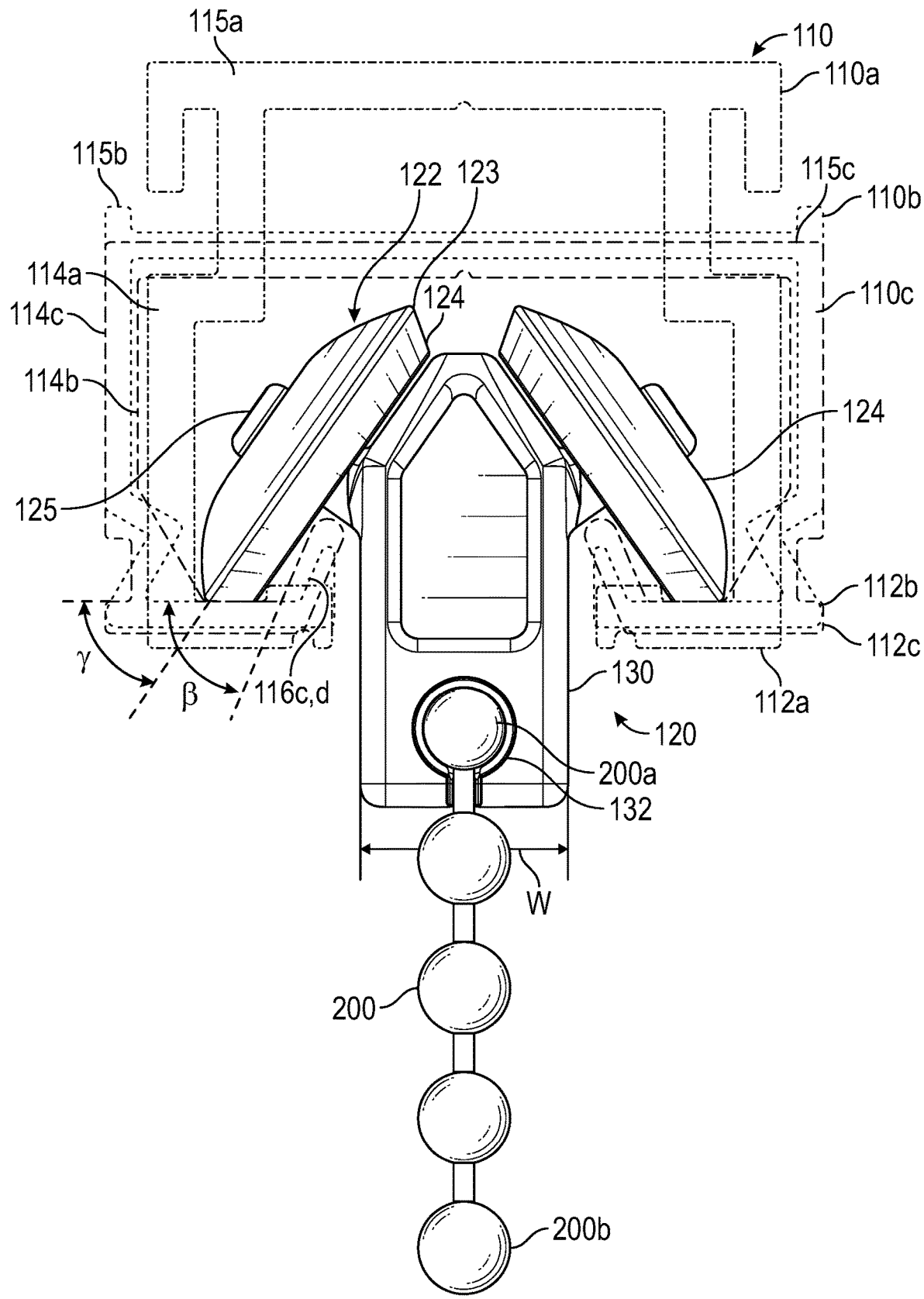
FIG. 2A shows a front view of dimensioning a wheel system according to a first embodiment of the invention having multiple tracks overlayed.
Figure 2B:
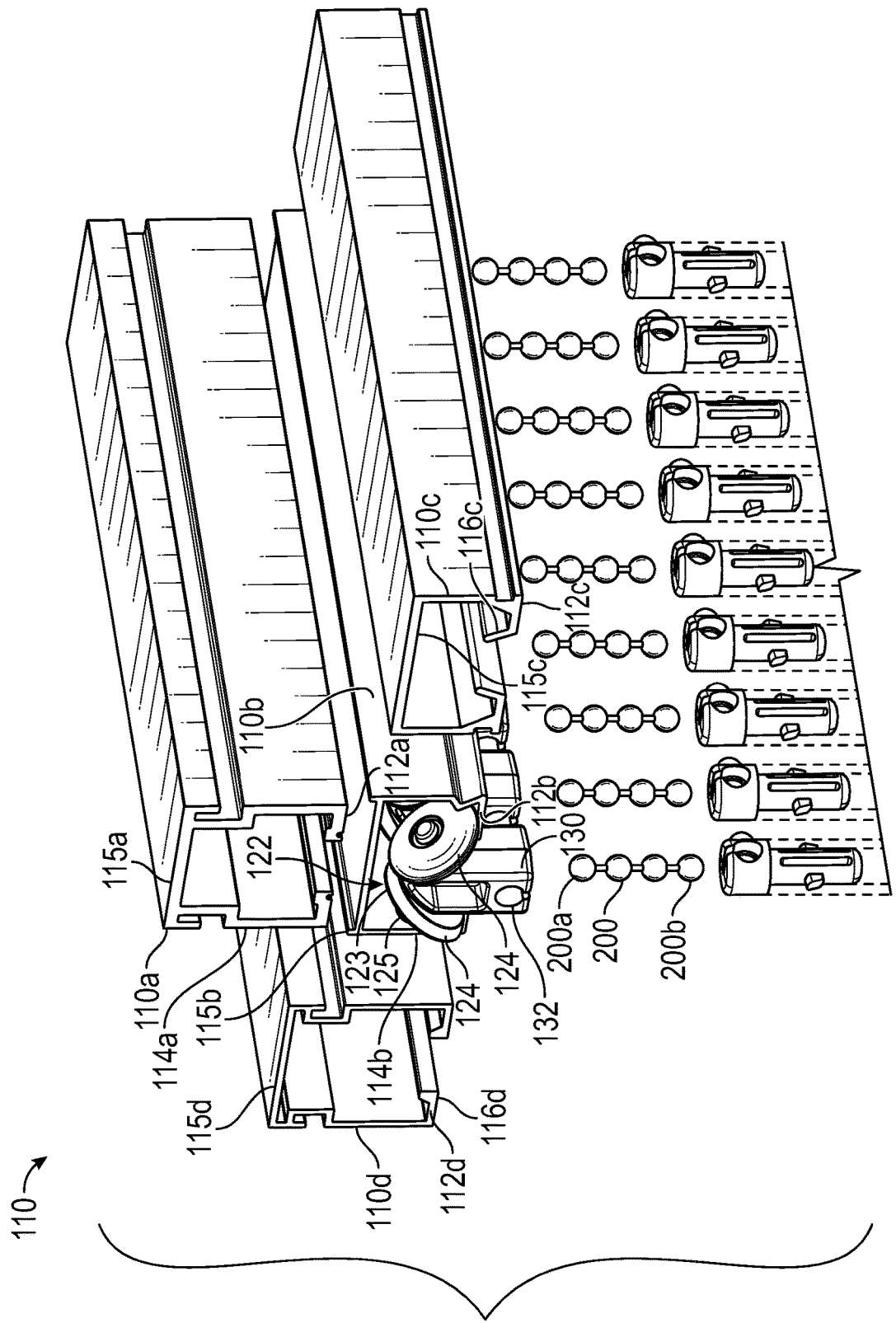
FIG. 2B shows a front view of dimensioning a wheel system according to a first embodiment of the invention having multiple tracks in an exploded view.

Referring to FIG. 2, a track(s) 110 are shown. The track(s) 110 is bolted, screwed, glued or otherwise attached to the ceiling. The track may also be on a hanging system and hang from the ceiling. The track 110 has an end piece (not shown) with snap connectors for the end piece. Running inside the track are roller hooks or rollers with wheel systems 120 having guide, rollers or wheels 122, 124. Additionally, other types of arrangements other than rollers or wheel systems 120 may be used so long as the slide easily along the track guides 118 such as slides, balls, or the like. Extending from the rollers or wheels are a link 200, i.e. a ball chain which is inserted for ease of replacement in an opening or bore 132.

The tracks 110 shown in FIG. 2 is actually a representation of a graphic drawing of four tracks overlain to arrive at a proper wheel angle and size and a wheel carriage 130 size. A first track 110a has a base track 112a, a side of track 114a and both sides and a top of track 115a. A second track 110b has a base track 112b, a side of track 114b and both sides and a top of track 115b. A third track 110c has a base track 112c, a side of track 114c and both sides and a top of track 115c. A fourth track 110d has a base track 112d, a side of track 114d and both sides and a top of track 115d. The tracks 110a-d are overlain and engineering calculations are made to obtain a width w of the wheel carriage 130. In addition, angle β, the angle between base of tracks 112a, 112b, 112c, 112d and track angle 116c, d is calculated. Each guide, roller or wheel has a circumference 123 and a wheel axle 125. In order so that the roller, guide or wheel 122 rotates smoothly in the track the inner contact surface 124 must be angled, inclined, rounded, flattened or tilted with respect to the base 112a-d so as to ride evenly on the base of all the base tracks 112a, 112b, 112c, 112d using angle γ, the angle between base of track 112a, 112b, 112c, 112d and circumference of guide, roller or wheel 123. In this case, the inner contact surface 124 is parallel or rides evenly upon the base of the track 112a-d. In FIG. 7, the inner contact surface 624 is rounded so as to ride evenly on the base. As shown, the angle γ must be such that the wheels 122 will not be hindered or rub on either the track angle 116c or 116d. If calculations are not made and accurately tested, an installer will need to carry multiple wheel systems depending upon the track used. This wheel system 120 only requires a single type or reduced number of wheels 122 to fit into one of four different tracks. Furthermore, wheel system 620 can fit into multiple tracks. Thus, using three wheel systems 120, 620 and 820 at least seven different tracks may be accommodated using only three wheels, whereas seven were needed in the past. The wheel system 120 is for use with a track 110, said wheel system 120 comprising: a wheel carriage 130, a set of wheels 122, 124 attached to the wheel carriage 130; a link 200, having a first end 200a, operatively attached to the wheel carriage 130 in slotted opening 132; wherein angles γ, β of the wheels and the width of the wheel carriage w are sized to fit into multiple sizes of tracks. The angles γ, β of the wheels and the width of the wheel carriage w are sized by overlaying multiple tracks in a design drawing and arriving at dimensions based upon overlaying multiple tracks.

Figure 3:
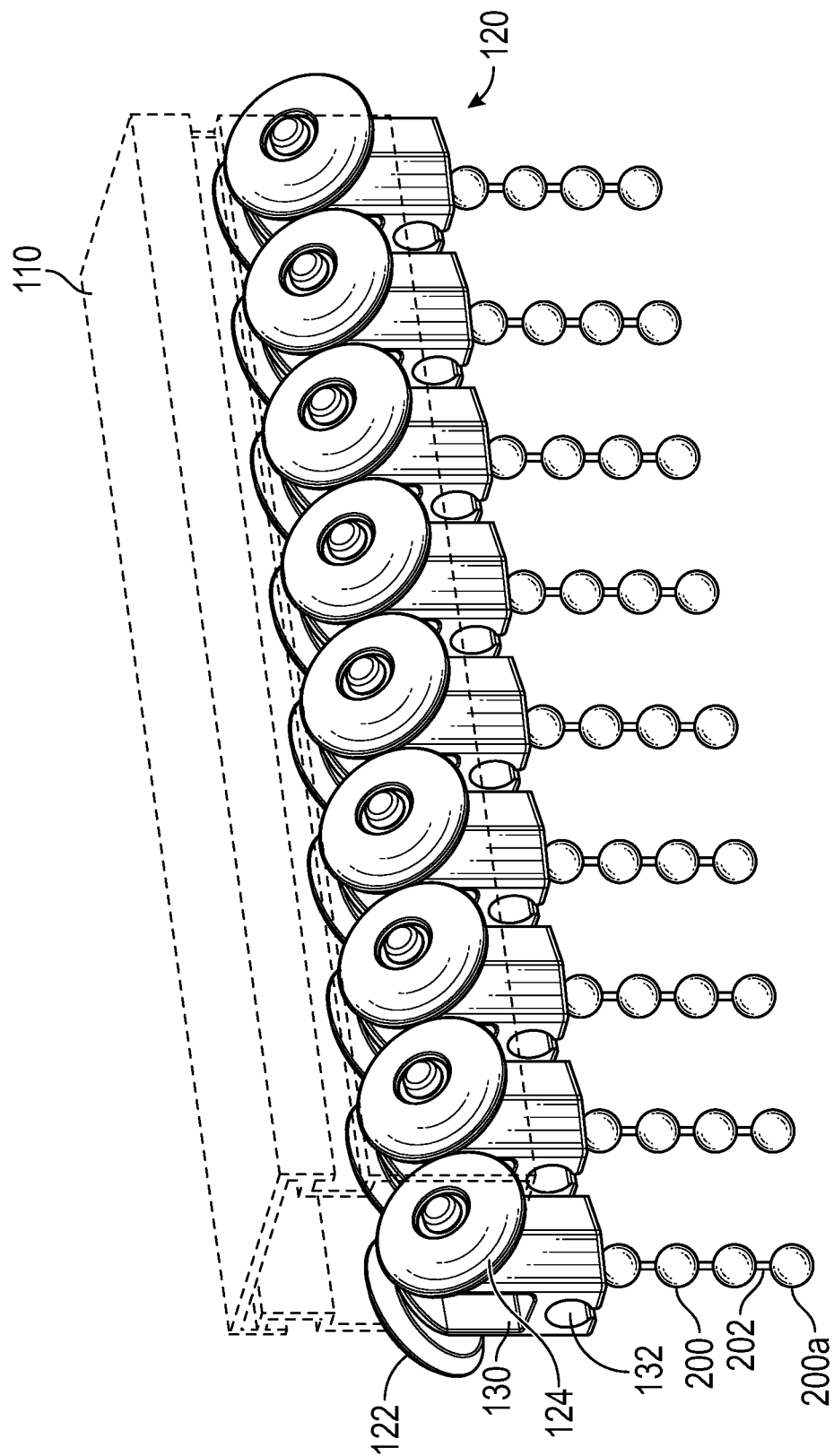
FIG. 3 shows a front and side perspective view of a wheel system according to a first embodiment of the invention.

FIG. 3 illustrates track 110 with multiple wheel systems 120 having wheels, guides or rollers 122, wheel carriages 130, links 200.

Figure 4:
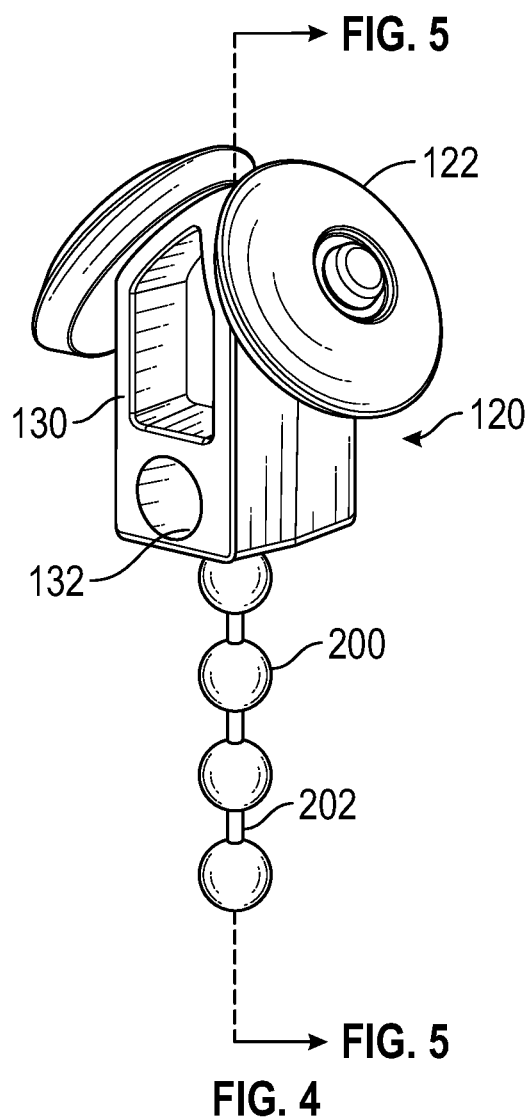
FIG. 4 shows a front and side perspective view of a wheel system (without end cap) according to a first embodiment of the invention.
Figure 5:
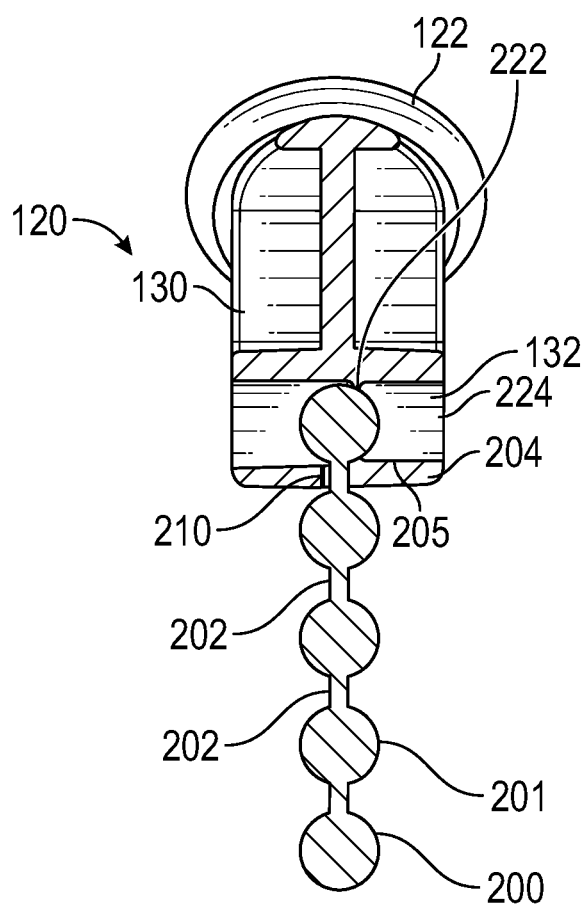
FIG. 5 shows a side perspective view of a wheel system through 5-5 according to a first embodiment of the invention.

FIG. 4 shows a perspective view of a single wheel system 120. The links 200 may be balls 200a having lines or wires 202 therebetween. Line 5-5 shows the cutaway of FIG. 5. FIG. 5 shows a cutaway of the wheel system 120 showing the guide roller or wheel 122, the wheel carriage 130, the link 200 or ball chain having balls 201 and line or wire 202. Within the slotted opening 132 is a slot 204, a back wall 210, a nib 205 and a cylindrical opening 224. During use a ball 202 of the ball chain is placed into the opening 132 and slid along until it engages the nib 202. The cylindrical opening has a first diameter 224 and the nib 202 has a second diameter 222 so that the ball 202 must be press fitted over the nib to engage and be held in the center of the opening. The nib 202 is tapered so that during the press fit, the ball 200 may be slid over the nib 202 to be held in place.

Figure 6:
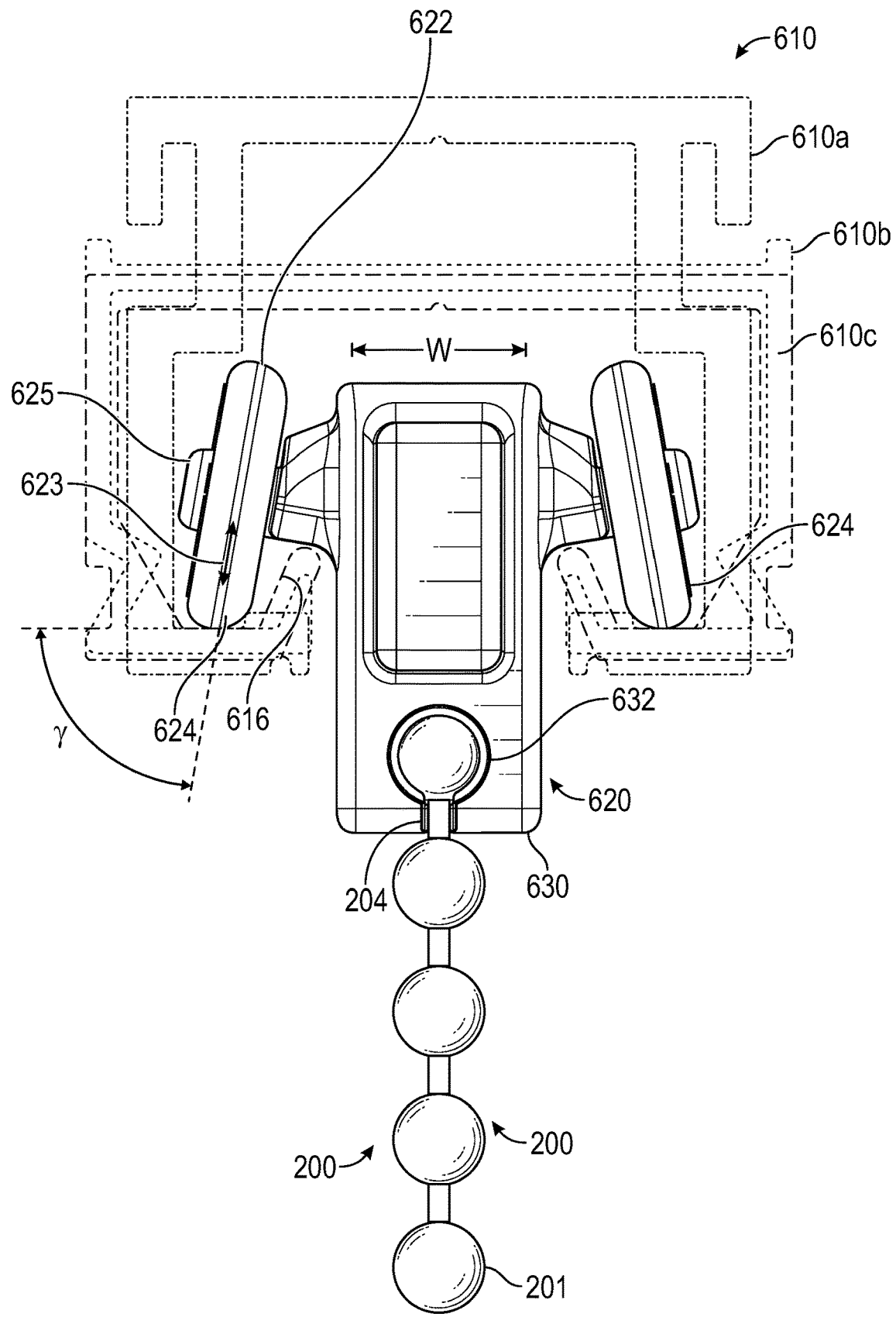
FIG. 6 shows a front view of dimensioning a wheel system (without end cap) in overlayed track systems according to a second embodiment of the invention.

FIGS. 6 and 7 shows an alternate embodiment which a track system 610. The track 610 shown in FIG. 6 is actually a representation of a graphic drawing of 3 tracks 610a, 610b, 610c overlain to arrive at a proper wheel angle and size and a wheel carriage 630 size. The tracks 610a-c are overlain and engineering calculations are made to obtain a width w of the wheel carriage 130. In addition, angle δ, the angle between base of tracks 610a, 610b and 610c and wheel circumference 622 is calculated. Each guide, roller or wheel has a circumference 623 and a wheel axle 625. In order so that the roller, guide or wheel 622, 624 rotates smoothly in the track the inner contact surface 124 must be angled to ride evenly on the base of all the base tracks 610a, 610b, 610c using angle δ, the angle between base of track 610a, 610b, 610c and circumference of guide, roller or wheel 123. If calculations are not made and accurately tested, an installer will need to carry multiple wheel systems depending upon the track used. This wheel system 620 only requires a single type of wheel 622 to fit into one of three different tracks.

FIG. 8 shows a third embodiment of a wheel system 820. In certain instances, a wheel is dimensioned so that it may not fit into any track. In this case the wheels 822 and 824 are small. The wheels 822 and 824 have a wheel axle 825. The wheels are positioned on a carriage 830 and have an opening 832 for receiving the link 200.

Figure 9:
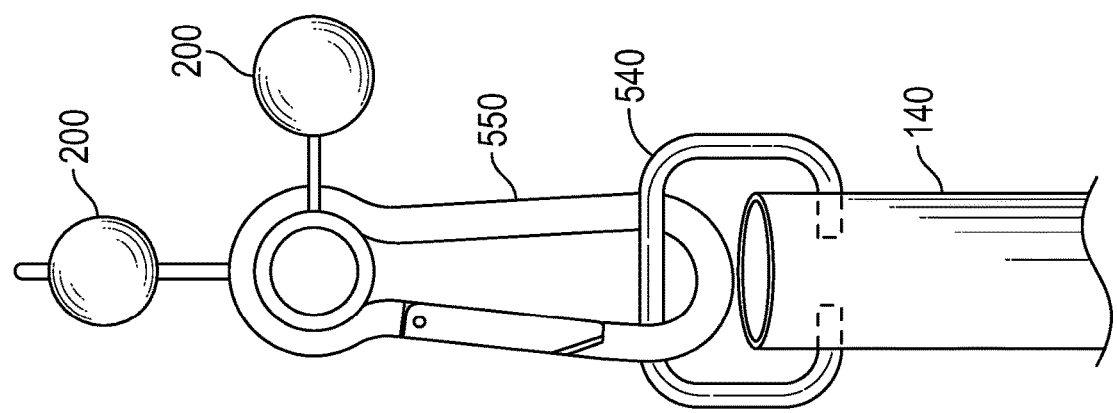
FIG. 9 shows an attachment without endcap according to an embodiment of the invention.

FIG. 9 shows a first type of link 200 attachment to an extension 140 or quick connect (not shown). The extension 140 has a wire loop that is attached thereto. The wire loop 540 is attached to the link 200 via a clasp or clip 550 through the wire loop 540. In this instance, a wheel system 120 is attached for use with a track 110, said wheel system comprising: a wheel carriage 130; a set of wheels 122, 124, attached to the wheel carriage 130; an extension connector 540 or wire loop is adapted to be attached to curtain hanging system such as the extension or quick connect. A link 200, having a first end, releasably attached to the wheel carriage 130 and a second end releasably attached to an extension 140 using clip or clasp 540.

Figure 10:
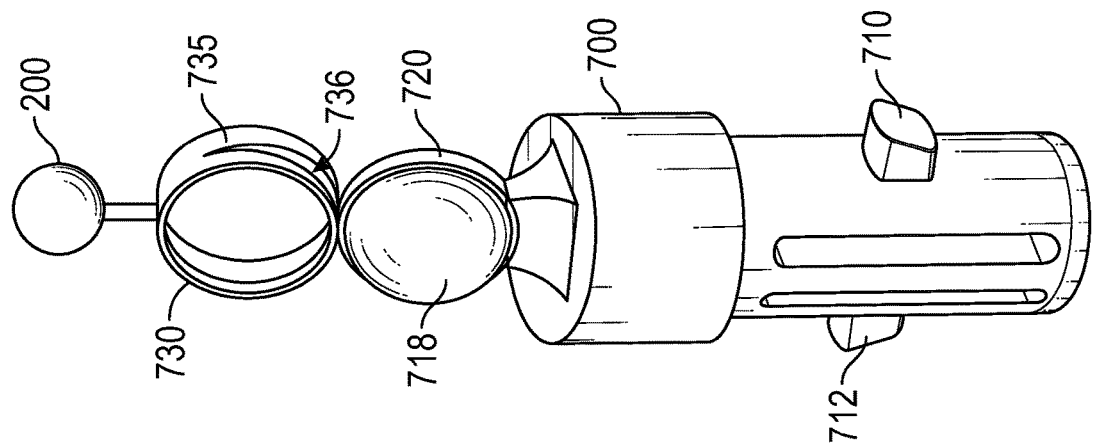
FIG. 10 shows a first embodiment of an end cap of an embodiment of the invention.

FIG. 10 shows an alternate embodiment of the invention. In FIG. 10 is shown an end cap 700 having a solid circular plastic portion 718 molded therewith. The plastic portion 718 is solid and has a groove 720 therein for mating with corresponding springed circular openings 720, 735. A slot 736 is cut into the circular springed openings 720, 735 and will engage the groove 720. The circular springed openings are attached to the link 200.

Figure 11:
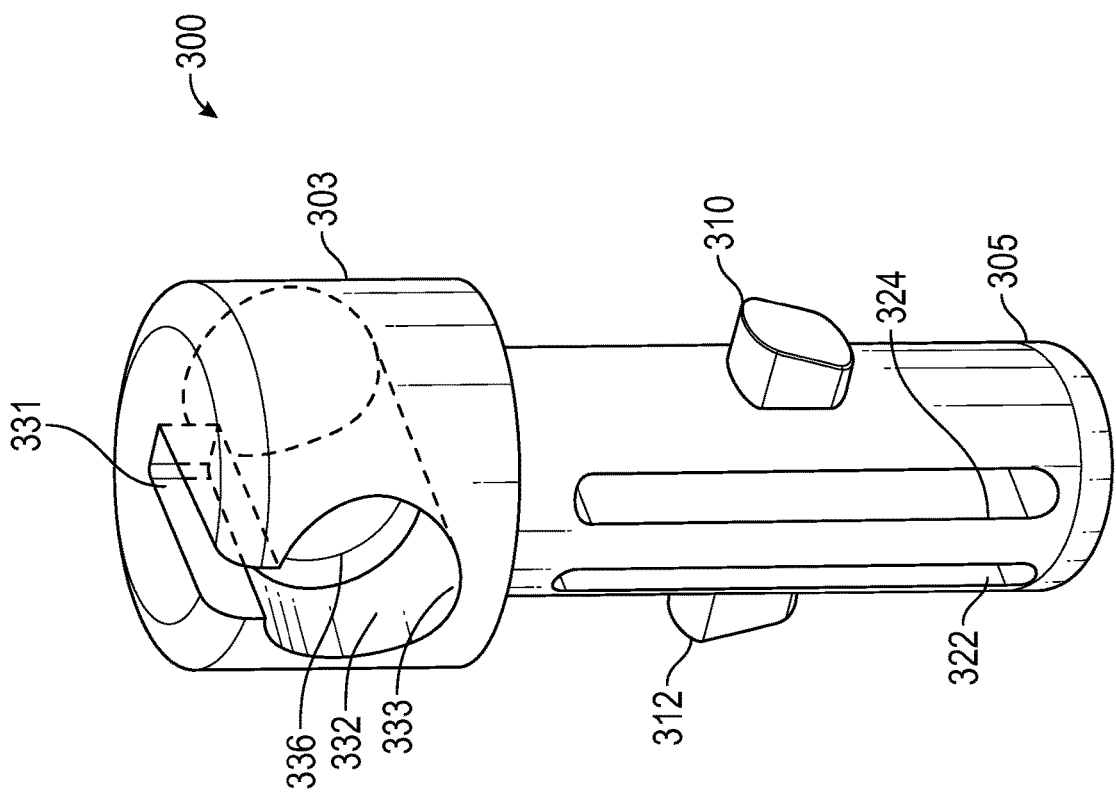
FIG. 11 shows a second embodiment of an end cap of an embodiment of the invention.

FIG. 11 shows another embodiment of an end cap 300. This end cap 300 includes a cylindrical portion or lower portion 305 for engagement with one of an extension 140 or a quick release system 150, said cylindrical portion or lower portion 305 further including a catch 310, 312 for attachment to the extension 140; and a cap 303, extending from said cylindrical portion or lower portion 305, said cap 303 having a connector 333 for attaching to a wheel carriage 130. Although the lower portion is shown for insertion into a hollow tube or rod 140, alternatively, the lower portion 305 may extend around the outside of hollow tube or rod 140. The catch 310, 312 is a plurality of protrusions, wherein the plurality of protrusions are tapered along an axis of the cylinder 305, said plurality of protrusions 310, 312 adapted for engaging with openings within the extension. The cylindrical member 305 has a plurality of slots 322, 324 therein for allowing the plurality of extensions 310, 312 to flex and engage the openings within the extension. The cap 303 has a connector which includes a slotted opening 332 having a first diameter and a second diminished diameter at a nib 336 for engaging and releasably attaching a ball chain on a link 200. The slotted opening 332 extends all the way through the upper portion of the end cap so that a punch or other tool may be inserted in the back for removal of a ball 201 of the ball chain. An advantage of such a connector is that the connector has a joint that allows 360 degrees of rotation about the axis of the hollow tube or rod for alignment of a quick release.

Figure 12:
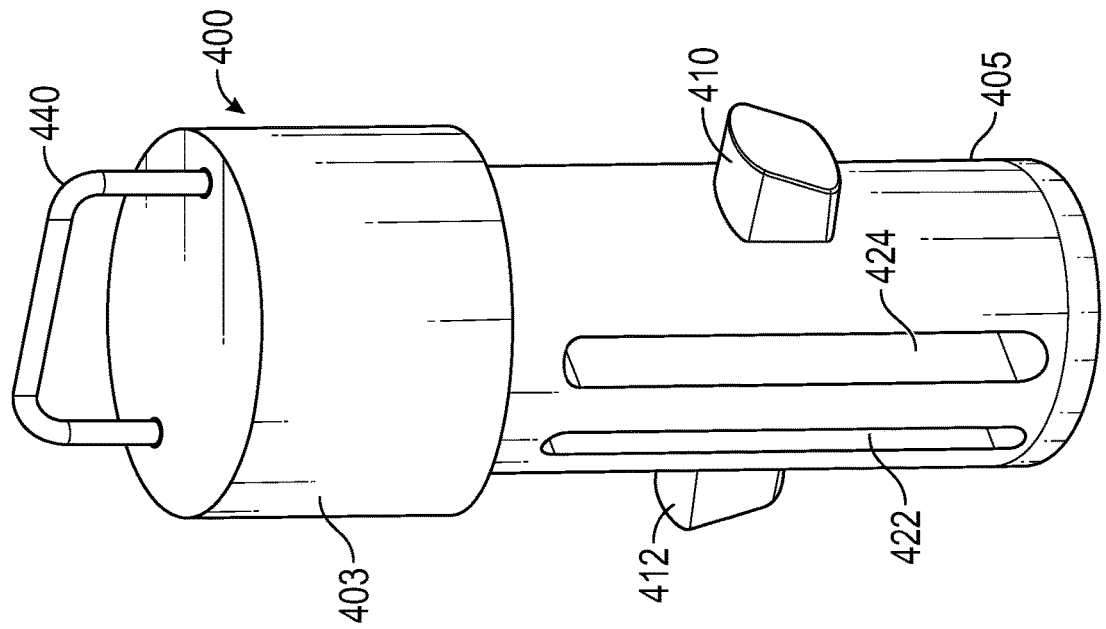
FIG. 12 shows a third embodiment of an end cap of an embodiment of the invention.

Referring to FIG. 12, the connector of the cap 400 includes an eyelet or a handle 440 and has protrusions or catch 410, 412 and slots 422 and 424 on cylindrical body 405.

Figure 13:
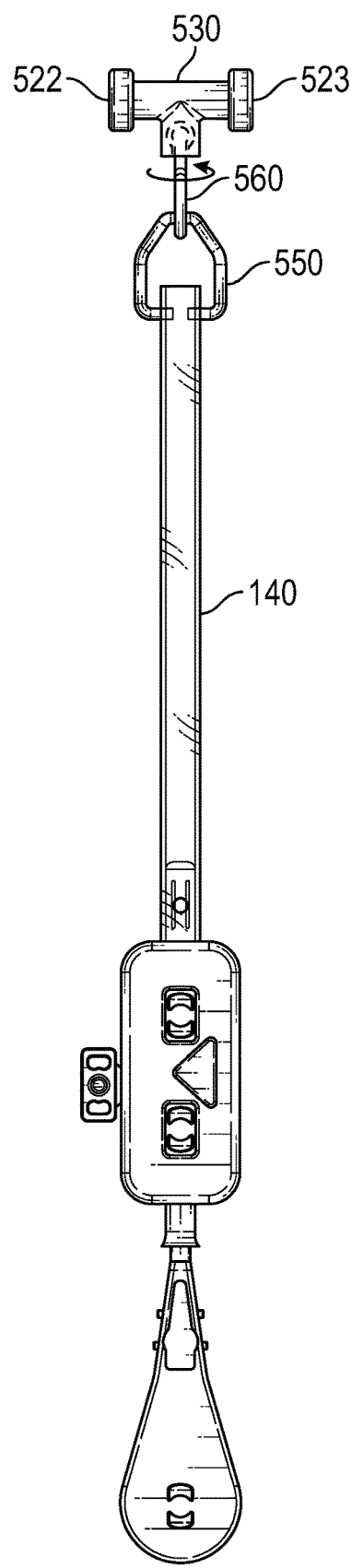
FIG. 13 shows a front side of an embodiment of an attachment of a wheel system.
Figure 14:
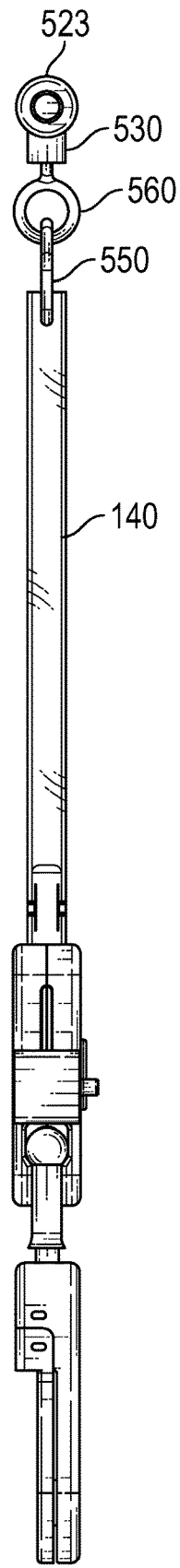
FIG. 14 shows a side view of the embodiment of FIG. 13 of an attachment of a wheel system.

Referring to FIGS. 13 and 14, a wheel system is shown with a link or eyelet 560 and wire clip or clasp 550. The clip or clasp 550 attaches to an extension 140. Holes are drilled into the extension 140. The portion of the eyelet 560 that attaches to the wheel carriage 530 having wheels 522 and 523.

Figure 15:
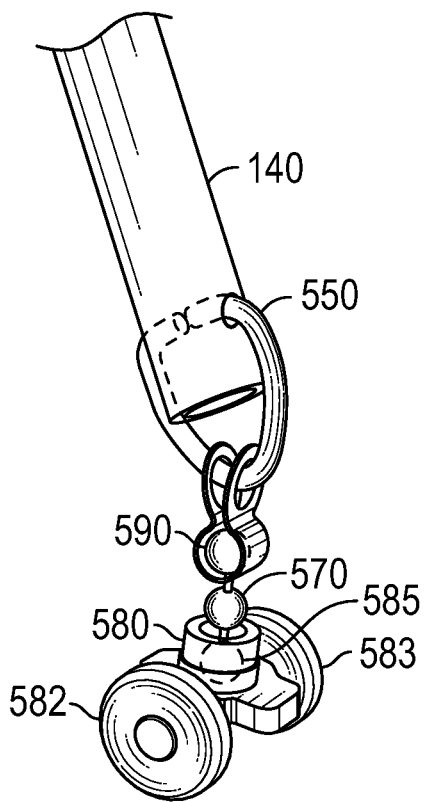
FIG. 15 shows another embodiment of an attachment of a wheel system.

FIG. 15 shows an alternate wheel system. The wheel carriage 580 includes wheels 582 and 583. The wheel carriage 580 is attached to a ball chain 570. One of the balls 585 on one side is encased within the wheel carriage 580. The opposite side ball is attached to a ball clip 590 which is attached to a wire clip or clasp 550 which is attached to an extension 140.

Figure 16:
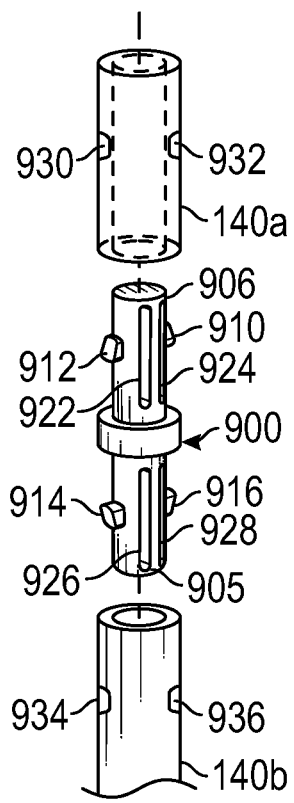
FIG. 16 shows an extension attachment for attaching two extensions together.

FIG. 16 shows an extension connector 900. The connector assists in connecting extensions 140a and 140b. The extensions 140a and 140b have holes 930, 932 and 934, 936 which engage with catches 910, 912, 914 and 916. The catches 910, 912, 914 and 916 are tapered so as to allow the catches to slide into the holes 930, 932, 934 and 936 when the ends 905 and 906 are inserted into the rods or extensions 140a, 140b. The connector has material removed at 922, 924, 926 and 928 to allow the connector to flex. The advantage of the extension connector 900 is so that the length of the entire extension may be changed by adding or decreasing extensions 140a, 140b. For example if an installer enters into a facility for installation with 24 inch rods or extensions 140a, 140b and discovers a room that needs 36 inch rods rods or extensions. The installer may add 12 inches to the 24 inch rods or extensions to arrive at 36 inch rods or extensions.

A method for attaching a disposable curtain system is also disclosed. The method is performed by providing a track 110. Next is the step of preassembling a wheel system 120 having a wheel carriage 130, wheels 122, 124 are attached to the wheel carriage 130, a link 200, having a first end releasably attached to the wheel carriage 130e; and an extension 140 releasably attached to a second end of the link 200. The step of inserting an end connector such as an end cap 300, 400 or a clip or clasp 550 with wire loop 540 into an extension 140 or a quick release system 150. The wheel system 130 is inserted onto the track; and attaching the curtain 180 using a curtain attachment 160 to the quick-release system 150.

In the method, the extension 140 has a first end attached to an end cap 300, 400 and a second end attached to the quick release system 150.

The method further comprising: providing an end cap 300, 400, 700 with a cylindrical portion 305, 405 for engagement with the extension 140 or quick release 150, said cylindrical portion 305, 405 further including a catch 310, 312 or 310, 412 for attachment to the extension 140; and a cap 303, extending from said cylindrical portion 305, said cap 303 having a connector 332 for attaching to a wheel carriage 130; and the step of inserting the end cap 300, 400 further comprises inserting the cylindrical end 305, 405 into an extension 140 or a quick release system.

A further method includes assembly of an end cap with a wheel system, comprising: providing a end cap 300, 400, 700; inserting the end cap 300, 400, 700 into a hollow tube or rod 140; and releasably attaching the end cap 300, 400, 700 to a wheel system 120, 620, 820.

The end caps 300, 400, 700 and wheels systems are all made using injection molded parts using materials such as thermoplastic or thermosetting polymers, elastomers or metals. Common polymers like epoxy and phenolic are examples of thermosetting plastics which nylon, polyethylene and polystyrene are thermoplastic or acytel plastics.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

What is claimed is:

1. An end cap or connector for a wheel system, said end cap or connector comprising:
   a cylindrical portion for engagement with one of an extension or a quick release system, said cylindrical portion further including a catch for attachment to the extension or quick release, wherein said catch is a plurality of protrusions tapered along an axis of the cylinder, including at least one protrusion adapted for engaging with openings within the extension; and
   a cap, extending from said cylindrical portion, said cap having a connector for attaching to a wheel carriage or another extension,
   wherein the connector of the cap includes a slotted opening,
   wherein the slotted opening is a cylindrical opening and adapted to receive an end ball on a ball chain,
   wherein the cylindrical opening includes a first diameter for receiving the end ball of the ball chain and a second diameter or reduced diameter for engaging and releasably retaining the end of the ball of the ball chain.

2. The end cap of claim 1, wherein the cylindrical portion has a plurality of slots therein for allowing the cylindrical portion to flex and engage the openings within the extension.

3. The end cap of claim 1, wherein the connector of the cap includes an eyelet or a handle.

4. The end cap of claim 1, wherein the reduced diameter is an internal raised portion for engaging the end ball of the ball chain.

5. An end cap for a wheel system, said end cap comprising:
- a lower portion for engagement with one of an elongate hollow tube or rod, wherein said elongate hollow tube or rod has openings therein for engaging said lower portion, said lower portion further including a catch for attachment to the elongate hollow rod and engaging with said openings; and
- an upper portion, extending from said lower portion, said upper portion having a connector for releasably attaching to a wheel carriage,
- wherein said end cap further comprises an opening in the upper portion sized for receiving a ball chain,
- wherein said opening is cylindrical and has a length and a diameter and further comprises a nib for holding a ball of said ball chain, wherein said nib reduces the diameter of the cylinder as compared to the opening in the upper portion sized for receiving the ball chain.

6. The end cap for a wheel system of claim 5, wherein the opening extends from one side of the upper portion to the other.

7. The end cap for a wheel system of claim 5, wherein the end cap is releasable attached to a ball chain.

8. A method for assembly of an end cap with a wheel system, comprising:
- providing an end cap having a cylindrical portion for engagement with one of an extension or a quick release system, said cylindrical portion further including a catch for attachment to the extension or quick release; and
- a cap, extending from said cylindrical portion, said cap having a connector for attaching to a wheel carriage or another extension,
- wherein the connector of the cap includes a slotted opening,
- wherein the slotted opening is a cylindrical opening and adapted to receive an end ball on a ball chain,
- wherein the cylindrical opening includes a first diameter for receiving the end ball of the ball chain and a second diameter or reduced diameter for engaging and releasably retaining the end of the ball of the ball chain,
- wherein the steps comprising, inserting the end cap into a hollow tube or rod; and
- releasably attaching the end cap to a wheel system.

9. The method of claim 8, wherein the wheel system further comprises a ball chain releasably attached to the wheel system and to the end cap.

* * * * *